SINGLE ERROR CORRECTING SYSTEM UTILIZING MAXIMUM LENGTH SHIFT REGISTER SEQUENCES

Filed Dec. 22, 1959 5 Sheets-Sheet 1

*INVENTOR.*
NORMAN M. ABRAMSON
*BY* [signature]
ATTORNEY

| $D_{11}$ | $D_{10}$ | $D_9$ | $D_8$ | $D_7$ | $D_6$ | $D_5$ | $D_4$ | $D_3$ | $D_2$ | $D_1$ |
|---|---|---|---|---|---|---|---|---|---|---|
| 0 | 1 | 0 | 1 | 0 | 1 | 0 | 0 | 1 | 1 | 0 |

| $P_4$ | $P_3$ | $P_2$ | $P_1$ | $D_{11}$ | $D_{10}$ | $D_9$ | $D_8$ | $D_7$ | $D_6$ | $D_5$ | $D_4$ | $D_3$ | $D_2$ | $D_1$ |
|---|---|---|---|---|---|---|---|---|---|---|---|---|---|---|
| 1 | 0 | 1 | 0 | 0 | 1 | 0 | 1 | 0 | 1 | 0 | 0 | 1 | 1 | 0 |

| CLOCK | SHIFT | DATA IN | 15 | | | | 17 | | | | OUT PUT LINE | | | | | | | | | | | | | | |
|---|---|---|---|---|---|---|---|---|---|---|---|---|---|---|---|---|---|---|---|---|---|---|---|---|---|
| | | | $F_1$ | $F_2$ | $F_3$ | $F_4$ | $P_1$ | $P_2$ | $P_3$ | $P_4$ | | | | | | | | | | | | | | | |
| $C_0$ RESET | | | 0 | 0 | 0 | 1 | 0 | 0 | 0 | 0 | | | | | | | | | | | | | | | |
| | 1 | | 1 | 0 | 0 | 0 | | | | | | | | | | | | | | | | | | | |
| 1 | | $D_1$ 0 | | | | | 0 | 0 | 0 | 0 | 0 | | | | | | | | | | | | | | |
| | 2 | | 1 | 1 | 0 | 0 | | | | | | | | | | | | | | | | | | | |
| 2 | | $D_2$ 1 | | | | | 1 | 1 | 0 | 0 | 1 | 0 | | | | | | | | | | | | | |
| | 3 | | 1 | 1 | 1 | 0 | | | | | | | | | | | | | | | | | | | |
| 3 | | $D_3$ 1 | | | | | 0 | 0 | 1 | 0 | 1 | 1 | 0 | | | | | | | | | | | | |
| | 4 | | 1 | 1 | 1 | 1 | | | | | | | | | | | | | | | | | | | |
| 4 | | $D_4$ 0 | | | | | 0 | 0 | 1 | 0 | 0 | 1 | 1 | 0 | | | | | | | | | | | |
| | 5 | | 0 | 1 | 1 | 1 | | | | | | | | | | | | | | | | | | | |
| 5 | | $D_5$ 0 | | | | | 0 | 0 | 1 | 0 | 0 | 0 | 1 | 1 | 0 | | | | | | | | | | |
| | 6 | | 1 | 0 | 1 | 1 | | | | | | | | | | | | | | | | | | | |
| 6 | | $D_6$ 1 | | | | | 1 | 0 | 0 | 1 | 1 | 0 | 0 | 1 | 1 | 0 | | | | | | | | | |
| | 7 | | 0 | 1 | 0 | 1 | | | | | | | | | | | | | | | | | | | |
| 7 | | $D_7$ 0 | | | | | 1 | 0 | 0 | 1 | 0 | 1 | 0 | 0 | 1 | 1 | 0 | | | | | | | | |
| | 8 | | 1 | 0 | 1 | 0 | | | | | | | | | | | | | | | | | | | |
| 8 | | $D_8$ 1 | | | | | 0 | 0 | 1 | 1 | 1 | 0 | 1 | 0 | 0 | 1 | 1 | 0 | | | | | | | |
| | 9 | | 1 | 1 | 0 | 1 | | | | | | | | | | | | | | | | | | | |
| 9 | | $D_9$ 0 | | | | | 0 | 0 | 1 | 1 | 0 | 1 | 0 | 1 | 0 | 0 | 1 | 1 | 0 | | | | | | |
| | 10 | | 0 | 1 | 1 | 0 | | | | | | | | | | | | | | | | | | | |
| 10 | | $D_{10}$ 1 | | | | | 0 | 1 | 0 | 1 | 1 | 0 | 1 | 0 | 1 | 0 | 0 | 1 | 1 | 0 | | | | | |
| | 11 | | 0 | 0 | 1 | 1 | | | | | | | | | | | | | | | | | | | |
| 11 | | $D_{11}$ 0 | | | | | 0 | 1 | 0 | 1 | 0 | 1 | 0 | 1 | 0 | 1 | 0 | 0 | 1 | 1 | 0 | | | | |
| | 12 | | 1 | 0 | 0 | 1 | | | | | | | | | | | | | | | | | | | |
| 12 | | $P_1$ 0 | | | | | 0 | 1 | 0 | 1 | 0 | 0 | 1 | 0 | 1 | 0 | 1 | 0 | 0 | 1 | 1 | 0 | | | |
| | 13 | | 0 | 1 | 0 | 0 | | | | | | | | | | | | | | | | | | | |
| 13 | | $P_2$ 1 | | | | | 0 | 0 | 0 | 1 | 1 | 0 | 0 | 1 | 0 | 1 | 0 | 1 | 0 | 0 | 1 | 1 | 0 | | |
| | 14 | | 0 | 0 | 1 | 0 | | | | | | | | | | | | | | | | | | | |
| 14 | | $P_3$ 0 | | | | | 0 | 0 | 0 | 1 | 0 | 1 | 0 | 0 | 1 | 0 | 1 | 0 | 1 | 0 | 0 | 1 | 1 | 0 | |
| | 15 | | 0 | 0 | 0 | 1 | | | | | | | | | | | | | | | | | | | |
| 15 | | $P_4$ 1 | | | | | 0 | 0 | 0 | 0 | 1 | 0 | 1 | 0 | 0 | 1 | 0 | 1 | 0 | 1 | 0 | 0 | 1 | 1 | 0 |
| | 16 | | | | | | | | | | | | | | | | | | | | | | | | |

FIG. 3

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | $D_1$ | $D_2$ | $D_3$ | $D_4$ | $D_5$ | $D_6$ | $D_7$ | $D_8$ | $D_9$ | $D_{10}$ | $D_{11}$ | $P_1$ | $P_2$ | $P_3$ | $P_4$ |
| $P_1$ | X | X | X | X | | X | | X | X | | | X | | | |
| $P_2$ | | X | X | X | X | | X | | X | X | | | X | | |
| $P_3$ | | | X | X | X | X | | X | | X | X | | | X | |
| $P_4$ | | | | X | X | X | X | | X | | X | X | | | X |

FIG. 3A

→ $P_4$ $P_3$ $P_2$ $P_1$ $D_{11}$ $D_{10}$ $D_9$ $D_8$ $D_7$ $D_6$ $D_5$ $D_4$ $D_3$ $D_2$ $D_1$
1 0 1 0 0 1 0 1 0 1 0 0 1 1 0

→ $D_{11}$ $D_{10}$ $D_9$ $D_8$ $D_7$ $D_6$ $D_5$ $D_4$ $D_3$ $D_2$ $D_1$
0 1 0 1 0 1 0 0 1 1 0

| CLOCK | SHIFT | DATA IN | 50 | | | | 52 | | | | 53 SHIFT REGISTER | | | | | | | | | | | | DATA OUT |
|---|---|---|---|---|---|---|---|---|---|---|---|---|---|---|---|---|---|---|---|---|---|---|---|
| | | | $F_1$ | $F_2$ | $F_3$ | $F_4$ | $P_1$ | $P_2$ | $P_3$ | $P_4$ | 1 | 2 | 3 | 4 | 5 | 6 | 7 | 8 | 9 | 10 | 11 | C | |
| START | | | 0 | 0 | 0 | 1 | 0 | 0 | 0 | 0 | | | | | | | | | | | | | |
| | 1 | | 1 | 0 | 0 | 0 | | | | | | | | | | | | | | | | | |
| 1 | | 0 | | | | | 0 | 0 | 0 | 0 | 0 | | | | | | | | | | | | |
| | 2 | | 1 | 1 | 0 | 0 | | | | | | 0 | | | | | | | | | | | |
| 2 | | 1 | | | | | 1 | 1 | 0 | 0 | 1 | 0 | | | | | | | | | | | |
| | 3 | | 1 | 1 | 1 | 0 | | | | | | 1 | 0 | | | | | | | | | | |
| 3 | | 1 | | | | | 0 | 0 | 1 | 0 | 1 | 1 | 0 | | | | | | | | | | |
| | 4 | | 1 | 1 | 1 | 1 | | | | | | 1 | 1 | 0 | | | | | | | | | |
| 4 | | 0 | | | | | 0 | 0 | 1 | 0 | 0 | 1 | 1 | 0 | | | | | | | | | |
| | 5 | | 0 | 1 | 1 | 1 | | | | | | 0 | 1 | 1 | 0 | | | | | | | | |
| 5 | | 0 | | | | | 0 | 0 | 1 | 0 | 0 | 0 | 1 | 1 | 0 | | | | | | | | |
| | 6 | | 1 | 0 | 1 | 1 | | | | | | 0 | 0 | 1 | 1 | 0 | | | | | | | |
| 6 | | 1 | | | | | 1 | 0 | 0 | 1 | 1 | 0 | 0 | 1 | 1 | 0 | | | | | | | |
| | 7 | | 0 | 1 | 0 | 1 | | | | | | 1 | 0 | 0 | 1 | 1 | 0 | | | | | | |
| 7 | | 0 | | | | | 1 | 0 | 0 | 1 | 0 | 1 | 0 | 0 | 1 | 1 | 0 | | | | | | |
| | 8 | | 1 | 0 | 1 | 0 | | | | | | 0 | 1 | 0 | 0 | 1 | 1 | 0 | | | | | |
| 8 | | 1 | | | | | 0 | 0 | 1 | 1 | 1 | 0 | 1 | 0 | 0 | 1 | 1 | 0 | | | | | |
| | 9 | | 1 | 1 | 0 | 1 | | | | | | 1 | 0 | 1 | 0 | 0 | 1 | 1 | 0 | | | | |
| 9 | | 0 | | | | | 0 | 0 | 1 | 1 | 0 | 1 | 0 | 1 | 0 | 0 | 1 | 1 | 0 | | | | |
| | 10 | | 0 | 1 | 1 | 0 | | | | | | 0 | 1 | 0 | 1 | 0 | 0 | 1 | 1 | 0 | | | |
| 10 | | 1 | | | | | 0 | 1 | 0 | 1 | 1 | 0 | 1 | 0 | 1 | 0 | 0 | 1 | 1 | 0 | | | |
| | 11 | | 0 | 0 | 1 | 1 | | | | | | 1 | 0 | 1 | 0 | 1 | 0 | 0 | 1 | 1 | 0 | | |
| 11 | | 0 | | | | | 0 | 1 | 0 | 1 | 0 | 1 | 0 | 1 | 0 | 1 | 0 | 0 | 1 | 1 | 0 | 0 | |
| | 12 | | 1 | 0 | 0 | 1 | | | | | | | | | | | | | | | | | |
| 12 | | 0 | | | | | 0 | 1 | 0 | 1 | | | | | | | | | | | | | |
| | 13 | | 0 | 1 | 0 | 0 | | | | | | | | | | | | | | | | | |
| 13 | | 1 | | | | | 0 | 0 | 0 | 1 | | | | | | | | | | | | | |
| | 14 | | 0 | 0 | 1 | 0 | | | | | | | | | | | | | | | | | |
| 14 | | 0 | | | | | 0 | 0 | 0 | 1 | | | | | | | | | | | | | |
| | 15 | | 0 | 0 | 0 | 1 | | | | | | | | | | | | | | | | | |
| 15 | | 1 | | | | | 0 | 0 | 0 | 0 | ← NO ERROR | | | | | | | | | | | | |
| | 1 | | 1 | 0 | 0 | 0 | 0 | 0 | 0 | 0 | | 0 | 1 | 0 | 1 | 0 | 1 | 0 | 0 | 1 | 1 | 0 | |
| 1 | | $D_1$ | | | | | $D_1$ | – | – | – | $D_1$ | | | | | | | | | | | | |

FIG. 5

$P_4$ $P_3$ $P_2$ $P_1$ $D_{11}$ $D_{10}$ $D_9$ $D_8$ $D_7$ →
1 0 1 0 0 1 0 0 0

$D_{11}$ $D_{10}$ $D_9$ $D_8$ $D_7$ $D_6$ $D_5$ $D_4$ $D_3$ $D_2$ $D_1$ →
0 1 0 1 0 1 0 0 1 1 0

| CLOCK | SHIFT | DATA IN | 50 | | | | 52 | | | | 53 SHIFT REGISTER | | | | | | | | | | | C | DATA OUT | |
|---|---|---|---|---|---|---|---|---|---|---|---|---|---|---|---|---|---|---|---|---|---|---|---|---|
| | | | $F_1$ | $F_2$ | $F_3$ | $F_4$ | $P_1$ | $P_2$ | $P_3$ | $P_4$ | 1 | 2 | 3 | 4 | 5 | 6 | 7 | 8 | 9 | 10 | 11 | | | |
| | 7 | | 0 | 1 | 0 | 1 | | | | | | | | | | | | | | | | | | |
| 7 | | 0 | | | | | 1 | 0 | 0 | 1 | 0 | 1 | 0 | 0 | 1 | 1 | 0 | | | | | | | |
| | 8 | | 1 | 0 | 1 | 0 | | | | | | 0 | 1 | 0 | 0 | 1 | 1 | 0 | | | | | | |
| 8 | | $D_8$ 0 | | | | | 1 | 0 | 0 | 1 | 0 | 0 | 1 | 0 | 0 | 1 | 1 | 0 | | | | | | |
| | 9 | | 1 | 1 | 0 | 1 | | | | | | 0 | 0 | 1 | 0 | 0 | 1 | 1 | 0 | | | | | |
| 9 | | 0 | | | | | 1 | 0 | 0 | 1 | 0 | 0 | 0 | 1 | 0 | 0 | 1 | 1 | 0 | | | | | |
| | 10 | | 0 | 1 | 1 | 0 | | | | | | 0 | 0 | 0 | 1 | 0 | 0 | 1 | 1 | 0 | | | | |
| 10 | | 1 | | | | | 1 | 1 | 1 | 1 | 1 | 0 | 0 | 0 | 1 | 0 | 0 | 1 | 1 | 0 | | | | |
| | 11 | | 0 | 0 | 1 | 1 | | | | | | 1 | 0 | 0 | 0 | 1 | 0 | 0 | 1 | 1 | 0 | | | |
| 11 | | 0 | | | | | 1 | 1 | 1 | 1 | 0 | 1 | 0 | 0 | 0 | 1 | 0 | 0 | 1 | 1 | 0 | | | |
| | 12 | | 1 | 0 | 0 | 1 | | | | | | | | | | | | | | | | | | |
| 12 | | 0 | | | | | 1 | 1 | 1 | 1 | | | | | | | | | | | | | | |
| | 13 | | 0 | 1 | 0 | 0 | | | | | | | | | | | | | | | | | | |
| 13 | | 1 | | | | | 1 | 0 | 1 | 1 | | | | | | | | | | | | | | |
| | 14 | | 0 | 0 | 1 | 0 | | | | | | | | | | | | | | | | | | |
| 14 | | 0 | | | | | 1 | 0 | 1 | 1 | | | | | | | | | | | | | | |
| | 15 | | 0 | 0 | 0 | 1 | | | | | | | | | | | | | | | | | | |
| 15 | | 1 | | | | | 1 | 0 | 1 | 0 | ← ERROR | | | | | | | | | | | | | |
| | 1 | | 1 | 0 | 0 | 0 | 1 | 0 | 1 | 0 | | 0 | 1 | 0 | 0 | 0 | 1 | 0 | 0 | 1 | 1 | 0 | | |
| | 2 | | 1 | 1 | 0 | 0 | | | | | | | 0 | 1 | 0 | 0 | 0 | 1 | 0 | 0 | 1 | 1 | 0 | $D_1$ |
| | 3 | | 1 | 1 | 1 | 0 | | | | | | | | 0 | 1 | 0 | 0 | 0 | 1 | 0 | 0 | 1 | 1 | $D_2$ |
| | 4 | | 1 | 1 | 1 | 1 | | | | | | | | | 0 | 1 | 0 | 0 | 0 | 1 | 0 | 0 | 1 | $D_3$ |
| | 5 | | 0 | 1 | 1 | 1 | | | | | | | | | | 0 | 1 | 0 | 0 | 0 | 1 | 0 | 0 | $D_4$ |
| | 6 | | 1 | 0 | 1 | 1 | | | | | | | | | | | 0 | 1 | 0 | 0 | 0 | 1 | 0 | $D_5$ |
| | 7 | | 0 | 1 | 0 | 1 | | | | | | | | | | | | 0 | 1 | 0 | 0 | 0 | 1 | $D_6$ |
| | 8 | | 1 | 0 | 1 | 0 | 1 | 0 | 1 | 0 | COMPARE & CORRECT | | | | | | | | 0 | 1 | 0 | ① | 0 | $D_7$ |
| | 9 | | 1 | 1 | 0 | 1 | 0 | 0 | 0 | 0 | | | | | | | | | | 0 | 1 | 0 | 1 | $D_8$ |
| | 10 | | 0 | 1 | 1 | 0 | | | | | | | | | | | | | | | 0 | 1 | 0 | $D_9$ |
| | 11 | | 0 | 0 | 1 | 1 | | | | | | | | | | | | | | | | 0 | 1 | $D_{10}$ |
| | 12 | | 1 | 0 | 0 | 1 | | | | | | | | | | | | | | | | | 0 | $D_{11}$ |
| | 13 | | 0 | 1 | 0 | 0 | | | | | | | | | | | | | | | | | | |
| | 14 | | 0 | 0 | 1 | 0 | | | | | | | | | | | | | | | | | | |
| | 15 | | 0 | 0 | 0 | 1 | 0 | 0 | 0 | 0 | | | | | | | | | | | | | | |
| | 1 | | 1 | 0 | 0 | 0 | 0 | 0 | 0 | 0 | | | | | | | | | | | | | | |
| 1 | | $D_1$ | | | | | $D_1$ | – | – | – | $D_1$ | | | | | | | | | | | | | |

FIG. 6

United States Patent Office 3,114,130

Patented Dec. 10, 1963

3,114,130

SINGLE ERROR CORRECTING SYSTEM UTILIZING MAXIMUM LENGTH SHIFT REGISTER SEQUENCES

Norman M. Abramson, Woodside, Calif., assignor to International Business Machines Corporation, New York, N.Y., a corporation of New York Filed Dec. 22, 1959, Ser. No. 861,267

11 Claims. (Cl. 340—146.1)

This invention relates in general to systems for detecting, locating and correcting errors in a binary code group consisting of parity bits and data bits, and in particular to a system for correcting single errors in a code group wherein the bit positions checked by each parity bit are determined in accordance with a systematic arrangement.

Various arrangements have been suggested in the prior art for checking coded information which has been translated between two points. These arrangements may be classified generally as either error detecting arrangements or error correcting arrangements. An example of an error detecting arrangement is the now well known parity check arrangement in which a parity bit position is added to the data bit positions of a binary code group. In this arrangement the binary value of the parity bit is chosen so that each code group has an even number of binary 1 bits. A similar known arrangement employs the same concept except that the value of the parity bit is chosen so as to provide an odd number of binary 1 bits in each code group. Such arrangements are, of course limited to the function of merely detecting the presence of an odd number of errors. They cannot detect an even number of errors, and they cannot locate or correct any errors.

An example of an error correcting system known in the prior art is represented by the system disclosed by Hamming et al. in U.S. Reissue 23,601 (U.S. 2,552,629). The theory of the Hamming code for single error correction may be readily understood by an analysis of the so-called parity check table. A parity check table corresponding to Table 2 in the above-mentioned reissued patent is reproduced below as Table 1 for convenience.

TABLE 1

| Parity Bit | Locator Subword | Code Group Position | | | | | | |
|---|---|---|---|---|---|---|---|---|
| | | $k_1$ | $k_2$ | $k_3$ | $D_1$ | $D_2$ | $D_3$ | $D_4$ |
| | | 1 | 2 | 3 | 4 | 5 | 6 | 7 |
| 1 | $k_1'$ | X | | | X | X | | X |
| 2 | $k_2'$ | | X | | X | | X | X |
| 3 | $k_3'$ | | | X | | X | X | X |

In the example represented by the above table a code group of seven bit positions is assumed, $D_1$–$D_4$ representing data bit positions, and $k_1$–$k_3$ representing parity bit positions. This table is a convenient way to indicate that pariy bit $k_1$ checks bit positions of the code group indicated by an X; that is, $k_1$ checks bit positions 1, 4, 5 and 7; parity bit $k_2$ checks bit positions 2, 4, 6 and 7; and parity bit $k_3$ checks bit positions 3, 5, 6 and 7.

When the code group is received some of the bits may be in error. At the receiver three more bits $k_1'$–$k_3'$ (comprising the locator subword) are computed. The parity check bit $k_1'$ will be equal to 0 if parity bit $k_1$ of the received code group satisfies its parity check, and equal to 1 if parity bit $k_1$ of the received code group does not satisfy its parity check. Parity check bits $k_2'$ and $k_3'$ depend on $k_2$ and $k_3$ of the received code group in the same manner.

If the code group of seven bits is translated correctly, $k_1'$–$k_3'$ will all be 0 assuming an even parity check. However, if one bit of the translated code group is received in error the locator subword $k_1'$–$k_3'$ (referred to by Hamming as the parity subgroup) will not be all 0's and, hence, a single error is readily detected. The particular bit position in which the detected error is located is indicated by the condition of the locator subword $k_1'$–$k_3'$.

The locator words and the respective bit positions which they indicate are in error are tabulated below in Table 2 for convenience, and correspond to Table 4 in the above mentioned reissued patent.

TABLE 2

| Error in Bit Position | Locator Subword | | |
|---|---|---|---|
| | $k_3'$ | $k_2'$ | $k_1'$ |
| $k_1$ | 0 | 0 | 1 |
| $k_2$ | 0 | 1 | 0 |
| $k_3$ | 1 | 0 | 0 |
| $D_1$ | 0 | 1 | 1 |
| $D_2$ | 1 | 0 | 1 |
| $D_3$ | 1 | 1 | 0 |
| $D_4$ | 1 | 1 | 1 |
| No errors | 0 | 0 | 0 |

The above table referred to as the locator subword table is based on the following reasoning and may be construed by reference to the parity check Table 1. To locate a particular bit position whose value has been received in error a reception parity check must be made over the same selected bit positions used in initially determining the value of each parity bit $k_1$–$k_3$. If a correct parity is received over the selected bit positions associated with each of the parity bits the locator subword $k_1'$–$k_3'$ is all 0's. If an error occurs in bit position 1, $k_1'$ is affected and becomes a 1, while $k_2'$ and $k_3'$ are not affected, since thhese parity bits do not check bit position 1. Hence, the locator subword for an error in bit position 1 is 100. Similarly, the locator subword for an error in bit position 2 is 010, and for an error in bit position 3, 001. An error in bit position 4 affects both $k_1'$ and $k_2'$, and hence the locator subword for an error in this bit position becomes 110. Similar reasoning may be employed to show that single errors in bit positions 5, 6 and 7 result in the locator subwords shown in Table 2. The obtaining of different locator subwords for indicating the bit position where a single error occurs is the basic concept on which the Hamming error-correcting system is based.

As explained by Hamming the parity check table for a single error correcting system satisfies two conditions. The first is that each bit position of the code group must be in a locator subword. The second condition is that the locator subword $k_1'$–$k_3'$ for each bit position of the code group must be different.

In many circumstances it is desirable to transmit a code group which has a relatively large number of bit positions. The main reasons for having a large number of bit positions is that the efficiency of a data transfer operation is greatly increased. For example, in a seven bit code group the ratio of redundant data to useful data is 3-to-4, while in a code group having 127 bit positions the ratio becomes 7-to-120. In providing a system that will generate seven parity bits from 127 bit positions with each parity bit checking a particular group of bit positions in the 127 bit positions, a very complex arrangement for assigning particular bit positions to a group arises unless some systematic approach is followed in the assignment process.

In order to simplify the assignment operation the prior art has suggested that another condition be added to the two conditions set forth in the Hamming reissued patent for construction of a systematic parity check table. This other condition allows the basic concept of the Hamming parity check table to follow a systematic approach when it is extended to code groups having a relatively large number of bit positions. This third condition is illustrated in the parity check table below, and may be stated as follows; a series of binary digits which form the locator subword for any bit position of the code group defines the number of the bit position in the code group when it is considered as a conventional binary number.

TABLE 3

| Parity Bits | 1 | 2 | 3 | 4 | 5 | 6 | 7 | 8 | 9 | 10 | 11 | 12 | 13 | 14 | 15 | Binary Order |
|---|---|---|---|---|---|---|---|---|---|---|---|---|---|---|---|---|
| | $D_1$ | $D_2$ | $D_3$ | $D_4$ | $D_5$ | $D_6$ | $D_7$ | $D_8$ | $D_9$ | $D_{10}$ | $D_{11}$ | $P_4$ | $P_3$ | $P_2$ | $P_1$ | |
| $P_1$ | X | | X | | X | | X | | X | | X | | X | | X | 1 |
| $P_2$ | | X | X | | | X | X | | | X | X | | | X | X | 2 |
| $P_3$ | | | | X | X | X | X | | | | | X | X | X | X | 4 |
| $P_4$ | | | | | | | | X | X | X | X | X | X | X | X | 8 |

It will be seen from the above table that a locator subword for any bit position in the code group is the binary equivalent of that position. For example, the locator subword for bit position 5 is 1010, and the locator subword for bit position 13 is 1011, which (when read from left to right) are the binary equivalents of decimal 5 and 13, respectively. Following a systematic approach in the construction of the parity check table results in a simplification of the parity bit assignment process in that a conventional binary counter may be employed in the system for generating gating signals which allow a particular group of bit positions to be checked by the respective parity bits. In the example above it will be seen that parity bit $P_1$ is assigned to check the group of bit positions consisting of $D_1$, $D_3$, $D_5$, $D_7$, $D_9$, $D_{11}$, $P_3$ and $P_1$. The output signal from the first stage of the conventional four stage binary counter would provide the necessary gating signals to allow the appropriate bit positions to be checked by parity bit $P_1$. Similarly, the output signal of the second, third and fourth stages would provide the correct gating signals to allow the appropriate bit positions to be checked by parity bits $P_2$, $P_3$ and $P_4$, respectively.

While systematizing the parity check table in the above described manner results in simplification of the parity bit assignment process, it creates the need for additional circuitry in that at least one of the particular parity bits also checks a bit position of the code group which contains another parity bit at a time when the condition of the parity bit to be checked is not final. For example, in the systemized parity check table above the group of parity bits checked by $P_4$ include parity bit positions 13 and 15 of the code group which are reserved for parity bits $P_3$ and $P_1$. However, if the code group is to be transmitted in a serial by bit fashion, $P_1$ cannot be transmitted in its proper sequence, since its final value cannot be determined until $P_3$ is determined. It can be shown that systemizing the parity check table in accordance with the above described process prevents the transmission of the data bits and the parity bits in a natural occurring sequence. Stated somewhat differently, single error correction systems known in the prior art cannot achieve the simplicity of circuitry obtained by systemizing the assignment of the bit positions to be checked and, at the same time, maintain the simple circuitry obtained under the condition where the assignment process is not systemized.

The present invention provides a single error correction system which maintains the advantages of a systematic assignment of the bit positions to be checked by each of the parity bits while still allowing the data bits and the parity bits to be transmitted in their proper order. The concept underlying the system may best be understood by reference to the parity check Table 4 below.

TABLE 4

| Parity Bits | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | $D_1$ | $D_2$ | $D_3$ | $D_4$ | $D_5$ | $D_6$ | $D_7$ | $D_8$ | $D_9$ | $D_{10}$ | $D_{11}$ | $P_1$ | $P_2$ | $P_3$ | $P_4$ |
| $P_1$ | X | X | X | X | | X | | X | X | | | X | | | |
| $P_2$ | | X | X | X | X | | X | | X | X | | | X | | |
| $P_3$ | | | X | X | X | X | | X | | X | X | | | X | |
| $P_4$ | | | | X | X | X | X | | X | | X | X | | | X |

The bit positions to be checked by parity bit $P_1$ are determined in accordance with an *m*-sequence. The term *m*-sequence is known in the art and may be defined by the output signal of one stage of a maximal length binary shift register having R stages. An *m*-sequence is merely a series of 0's of $2^R-1$ binary digits arranged in a predetermined order. A true *m*-sequence satisfies the condition that:

$$a_{t+R}=\sum_{j=1}^{j=R} C_j a_{t+(J-1)} \quad (1)$$

where $2^R-1$ is the number of binary digits in the sequence before it repeats itself and the symbol $a_t$ is employed to designate the value of the first binary digit in the sequence; $a_{t+1}$ the value of the second binary digit in the sequence; $a_{t+2}$ the value of the third binary digit in the sequence; etc. The above equation may also be expressed as:

$$a_{t+R}=C_1a_t+C_2a_{t+1}+C_3a_{t+2}+ \ldots +C_RA_{t+R-1} \quad (2)$$

where $C_1$–$C_R$ each represent a binary coefficient 0 to 1 determined from reference tables referred to as a "Table of Irreducible Polynominals Over Galois Field (2) Through Degree 19", by R. W. Marsh, a publication of the National Security Agency, dated October 24, 1957. Coefficients $C_1$–$C_R$ in effect determine the feedback path of the maximal length binary shift register.

The number of different *m*-sequences that are obtained from an R stage maximal length binary shift register is tabulated below:

| | | | | | | | | | |
|---|---|---|---|---|---|---|---|---|---|
| Number of stages | R=2 | 3 | 4 | 5 | 6 | 7 | 8 | 9 | 10 |
| Different *m*-sequences | 1 | 2 | 2 | 6 | 6 | 18 | 16 | 48 | 60 |

TABLE 5

The number of different *m*-sequences obtained from an R-stage *m*-sequence generator also corresponds to the number of different groups of coefficients $C_1$–$C_R$ which are available for *m*-sequences From the above table it will be seen that two different $m$-sequences may be obtained from a 4-stage maximal length linear binary shift register. When $C_1$–$C_R$ correspond respectively to 1100, the following $m$-sequence is obtained.

| | | | | | | | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| 1 | 0 | 0 | 1 | 1 | 0 | 1 | 0 | 1 | 1 | 1 | 1 | 0 | 0 | 0 |

When $C_1$–$C_R$ is 1001 the other $m$-sequence is obtained.

| | | | | | | | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| 1 | 1 | 1 | 1 | 0 | 1 | 0 | 1 | 1 | 0 | 0 | 1 | 0 | 0 | 0 |

With relation to the general Equation 1 for an $m$-sequence, the first sequence shown above is expressed specifically as $a_{t+4}=a_t+a_{t+1}$. In nonmathematical language this specific equation expresses the fact that the value of the fifth binary digit ($a_{t+4}$=the mod. 2 sum of the values of the first binary digit ($a_t$) and second binary digit ($a_{t+1}$). For example, the fifth digit in the $m$-sequence (1) is obtained by binary addition (mod. 2) of the first digit (1) and the second digit (0). The following digits of the $m$-sequence are obtained in the same manner until $2^R-1$ (15) digits are obtained. The $m$-sequence then repeats itself.

The second $m$-sequence is obtained in a similar manner, but since the coefficients $C_1$–$C_R$ are different, 1001, the specific equation becomes $a_{t+4}=a_t+a_{t+3}$. In other words the value of the first digit plus the value of the fourth digit will give the value of the fifth digit.

Referring again to the parity check table employed in connection with the present invention, if an X is replaced by a 1 and a blank by a 0 in each of the rows $P_1$–$P_4$, of the table, it will be seen that the sequence of 0's and 1's follow the $m$-sequence defined in line 10, column 5, where coefficients $C_1$–$C_4$ corresponds to 1001. The row designated $P_1$ in the table corresponds exactly to the $m$-sequence in line 10, column 5. The succeeding rows are merely shifted one position to the right. The output signals of the first stage of a four-stage maximal length binary shift register would provide the necessary gating signals to allow the appropriate bit positions to be checked by $P_1$. Similarly, the second, third and fourth stages of the shift register would provide the necessary gating signals to allow the appropriate bit positions to be checked by parity bits $P_2$, $P_3$ and $P_4$, respectively.

The assignment of the bit positions to be checked by each parity bit follows a systematic approach, and hence the assignment operation is readily implemented in the error correcting system. In addition, since each of the parity bits are in a final state at the time they are to be transmitted, the parity bits may be transmitted sequentially following the data bits in a serial by bit fashion without interruption.

In accordance with the present invention, the improved error correcting system comprises an encoder and a decoder which are interconnected by some suitable signal translating means. The encoder includes generally means to generate a predetermined number of parity bits depending upon the length of the code group to be transmitted, with each of the parity bits checking bit positions determined in accordance with an $m$-sequence, and means for transmitting the data bits and the parity bits to the decoder in the order in which they appear in the code group.

The decoder comprises generally means for making a reception parity check on bit positions of the code group which are determined in accordance with the $m$-sequence employed by the encoder, means operable in response to the generated reception parity bits for detecting an error, and means under the control of said generated reception parity bits for locating and correcting any single error which occurs in the code group.

It is therefore an object of the present invention to provide an improved system for correcting errors which occur during transmission of binary coded data.

Another object of the present invention is to provide an improved system for correcting single errors in a code group of transmitted data.

A further object of the present invention is to provide in an error correcting system which transmits a code group consisting of sequential data bit positions followed by sequential parity bit positions, systematic means for assigning bit positions of the code group to be checked to parity bits in a manner to allow each of the parity bits to obtain a final condition by the time the parity bit position of the code group has been reached.

The foregoing and other objects, features and advantages of the invention will be apparent from the following more particular description of the preferred embodiment of the invention, as illustrated in the accompanying drawings.

In the drawings:

FIG. 3 is a chart illustrating the operation of the encoder;

FIG. 3A is a parity check table similar to that shown in column 4 of the specification;

FIG. 5 is a chart illustrating the operation of the decoder when no error occurs during transmission of the code group; and FIG. 6 is a chart illustrating the operation of the decoder when a single error occurs during transmission of the code group.

Figure 1:
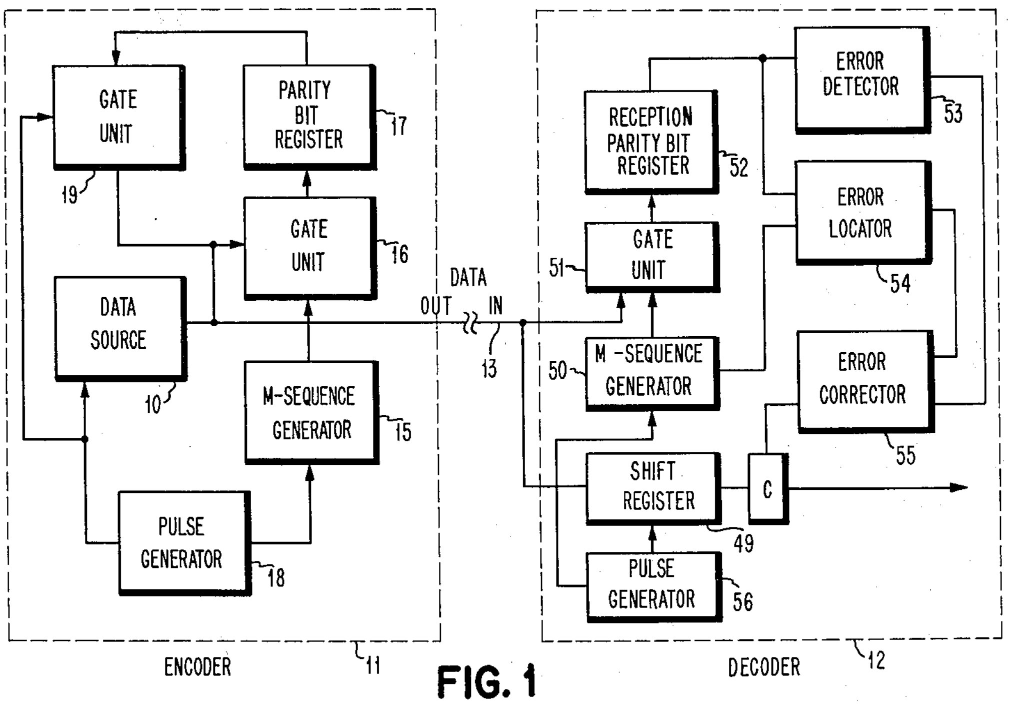
FIG. 1 is a block diagram of the system.

Referring to the drawings, and particularly to FIG. 1, an error correcting system embodying the present invention is illustrated in block form in FIG. 1. The system includes an encoder 11 and a decoder 12 which are interconnected by some suitable signal translating means 13.

The data translating means 13 interconnecting the encoder 11 and decoder 12 may take several forms, depending on the particular application involved. For example, the translating means 13 may represent either a commercial telephone link or a radio telephone link connecting one of a plurality of remote input stations to a centrally located data processing center, in which event the encoder 11 of the error correcting system is located in proximity with the remote input station and the decoder 12 is associated with the central data processing center. In another practical application, the data source and the utilization device may both be physically located in the same data processing unit, in which event the data translating means 13 interconnecting the encoder 11 and decoder 12 would employ in its simplest form a single conductor.

In the latter application, certain functional components common to both the encoder and the decoder could be eliminated in either the encoder or the decoder. However, since the first arrangement employing the encoder and the decoder at remote points lends itself to a more straightforward explanation of the system, the invention is illustrated and described as embodied in this arrangement. It is assumed that the system operates on a code group having fifteen positions consisting of eleven data bit positions and four parity bit positions, although any code group length greater than two may be employed, if desired.

As shown in FIG. 1, the encoder comprises an $m$-sequence generator 15, a gate unit 16, a parity bit register 17, a gate unit 19 and a generator of timed pulses 18. The details of the encoder may be seen by reference to FIG. 2.

Figure 2:
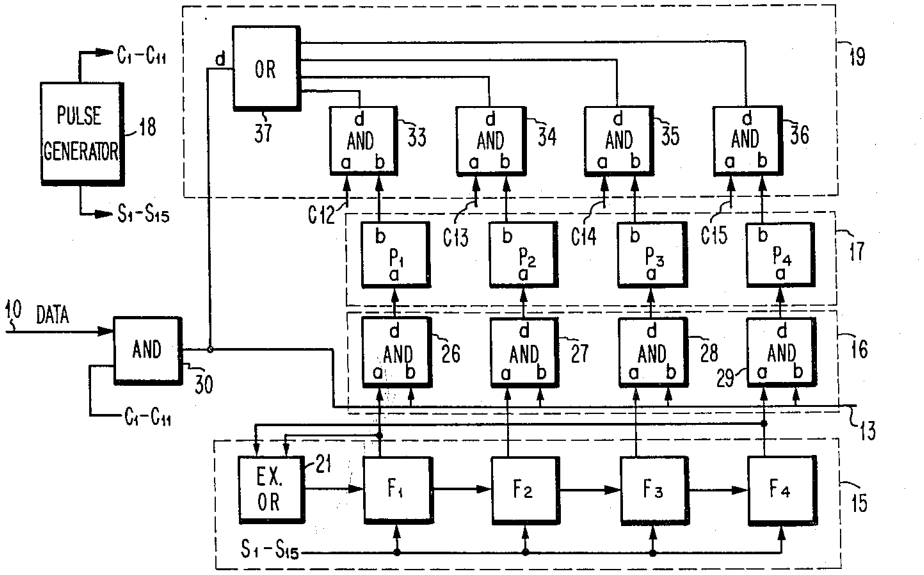
FIG. 2 is a schematic view of the encoder embodying the invention.

The $m$-sequence generator 15, as shown in FIG. 2, is similar to a conventional four-stage shift register except that a feedback path is established through the exclusive OR circuit 21 from the output of the first and fourth stages $F_1$ and $F_4$ back to the first stage $F_1$. The output of each stage F of the illustrated $m$-sequence generator provides the same $m$-sequences. However, the $m$-sequences are shifted relative to each other by one position. The $m$-sequence may be seen in FIG. 3 where the output of each stage $F_1$–$F_4$ of the $m$-sequence generator 15 is tabulated. It will be noted that each of the columns $F_1$–$F_4$ define the same fifteen digit $m$-sequence. However, the $m$-sequences in columns $F_2$, $F_3$ and $F_4$ are shifted relative to the $m$-sequence in column $F_1$. The particular $m$-sequence illustrated may be defined by the equation $a_t+a_{t+1}=a_{t+4}$. Generator 15 is started at a point in the sequence which allows stage $F_1$ to provide a series of three 0's at the end of the first cycle. Each stage of the $m$-sequence generator 15 is connected to the pulse generator 18 and is supplied with shift pulses S1–S15. The output of the stages $F_1$–$F_4$ are connected to the gate unit 16.

Gate unit 16 comprises four conventional AND gates 26–29 which are similar. Each AND gate has a pair of input terminals $a$ and $b$ and an output terminal $d$. Output terminal $d$ is in a high state only when both input terminals $a$ and $b$ are high. The output signal of each stage F of the $m$-sequence generator 15 is supplied to terminal $a$ of a different one of the AND gates 26–29. The other terminal $b$ of each AND gate is connected in parallel to an imput AND gate 30 which in practice may be incorporated in the data source 10 and conditioned under the control of clock pulses C1–C11 from pulse generator 18. The output tap $d$ of AND gates 26 through 29 are connected to the parity bit register 17.

The parity bit register 17, as shown, comprises four stages $P_1$–$P_4$. Any suitable bistable device known in the art may be employed for a stage of the register. For example, the bistable devices $P_1$–$P_4$ may be conventional Eccles-Jordan triggers arranged to change states alternately in response to successive pulses applied to input taps $a$. The output tap $d$ of AND gate 26 is connected to the input tap $a$ of stage $P_1$ of register 17. The output taps $d$ of AND gates 27, 28 and 29 are similarly connected to input taps $a$ of stages $P_2$, $P_3$ and $P_4$, respectively. The output taps $d$ of the stages $P_1$–$P_4$ are connected to the data-out line 13 through a gate unit 19.

In this instance the gate unit 19 comprises four conventional AND gates 33–36 which have their output taps $d$ connected to the input of a four terminal OR circuit 37. Input taps $a$ of AND gates 33–36 are connected to the pulse generator 18, each tap being supplied with a separate clock pulse to condition the respective AND gates. The input taps $b$ of AND gates 33–36 are supplied with signals from the four stages $P_1$–$P_4$, respectively, of register 17. The output terminal $d$ of OR gate 37 is connected to the data-out line 13.

Figure 4:
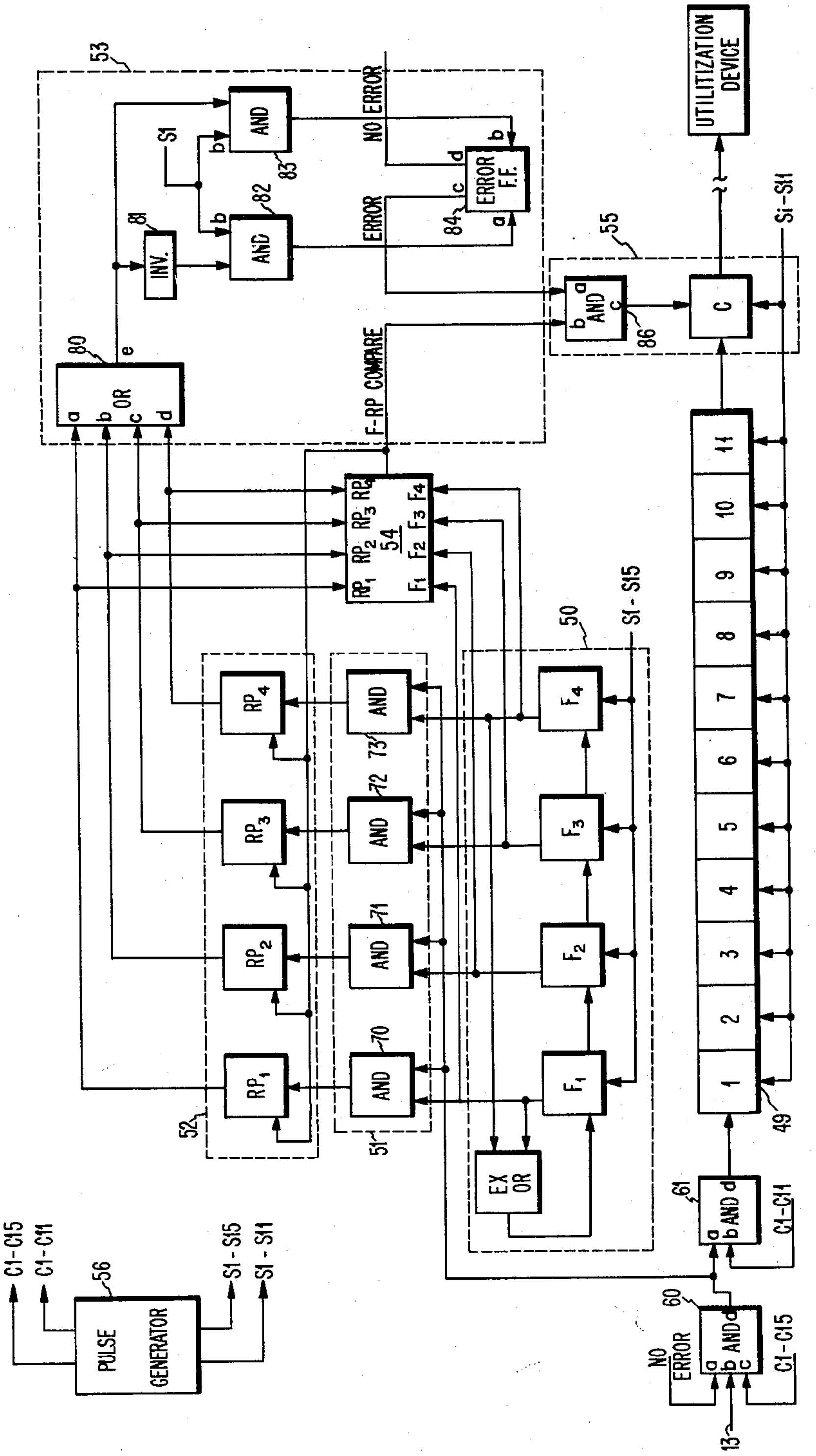
FIG. 4 is a schematic view of the decoder embodying the present invention.

The operation of the encoder may be seen by reference to FIGS. 3 and 4. It is assumed that the $m$-sequence generator 15 and the parity bit register 17 are in the condition shown on line 1 of the chart and that the eleven bits of data $D_1$–$D_{11}$ are supplied from the data source in the order shown in the third column of the chart.

The first shift pulse S1 causes the $m$-sequence generator 15 to change from the 0001 start condition to the 1000 condition. In this condition stage $F_1$ conditions AND gate 26 of unit 17 so that the data bit position $D_1$ may be checked for parity by $P_1$. The first data bit $D_1$ is clocked out from the data source during clock pulse time C1 and is supplied to the data-out line 13 and the gate unit 16 simultaneously. If the first data bit contains a 1, output tap $d$ of AND gate 26 will rise causing stage $P_1$ to change state. In the present example $D_1$ is 0 and, hence, $P_1$ does not change state.

Shift pulse S2 thereafter causes the $m$-sequence generator to advance to the 1100 condition. Stages $F_1$ and $F_2$ therefore condition AND gates 26 and 27 allowing the next data bit $D_2$, which in the present example is a 1, to pass through AND gates 26 and 27. Stages $P_1$ and $P_2$ of register 17 therefore change states as indicated in the chart.

The above operation is continued until the data bit positions $D_1$–$D_{11}$ have been checked for parity. Clock pulses C12–C15 applied to AND gates 33–36, respectively, of gate unit 19 cause the generated parity bits $P_1$–$P_4$ to be clocked out sequentially without interruption following the group of data bits $D_1$–$D_{11}$. Parity bits $P_1$–$P_4$ are also supplied to gate unit 16 so that bit position $P_1$ of the code group may be checked by parity bit $P_4$. Supplying parity bits $P_1$–$P_4$ to gate unit 16 also returns the parity bit register to its initial starting condition of 0000 so that the encoding of the next code group may begin immediately, if desired. The eleven data bits $D_1$–$D_{11}$, and the four parity bits $P_1$–$P_4$, as shown on the last line of FIG. 3, are translated to the decoder 12 by the signal translating means 13.

Referring again to FIG. 1, the decoder, as shown therein, comprises a shift register 49, an $m$-sequence generator 50, a gate unit 51, a reception parity bit register 52, an error detector 53, an error locator 54, an error corrector 55, and a pulse generator 56. The details of the encoder are shown in FIG. 4. As shown therein the shift register 49 comprises eleven stages 1–11. Data is supplied to the first stage from the signal translating means 13 through a pair of serially connected AND gates 60 and 61. AND gate 60 has one input tap $a$ which is connected to the error detector unit 53 and is normally high, provided that an error has not occurred in the last code group which was received; a second input tap $b$ which is connected to the signal translating means 13; and a third input tap $c$ which is connected to the pulse generator 56 and is supplied with clock pulses C1–C15.

The output tap $d$ of AND gate 60 is connected to gate unit 51 and to input tap $a$ of AND gate 61. The other other input tap $b$ is connected to the pulse generator 56 and is supplied with clock pulses C1–C11. Output tap $d$ of AND gate 61 is connected to the input of stage 1 of the shift register 49.

M-sequence generator 50, gate unit 51 and reception parity register 52 are identical to the $m$-sequence generator 15, gate unit 16, and parity bit register 17, respectively, of the encoder 11, and hence the detailed description of these units is not repeated here. Generally, $m$-sequence generator 50 supplies four sampling signals to the AND gates 70–73 of gate unit 51, so that appropriate bit positions of the received code group are checked. The output tap $c$ of AND gates 70–73 are connected to the stages $RP_1$–$RP_4$ of the reception parity bit register 52.

The error detector 53 comprises a four terminal OR circuit 80, an inverter 81, a pair of AND gates 82 and 83, and an error trigger 84. The four input terminals $a$, $b$, $c$ and $d$ of OR circuit 80 are connected to the respective output taps of stages $RP_1$–$RP_4$ of register 52. Output terminal $e$ of OR circuit 80 is connected to input tap $a$ of error trigger 84 through inverter 81 and AND gate 82, and also to input tap $b$ through AND gate 83. Taps $b$ of AND gates 82 and 83 are connected to the pulse generator 56 and are supplied with an S1 pulse.

The error locator 54 is shown in block form in FIG. 4 and is connected to the output of stages $RP_1$–$RP_4$ of generator 52 and to the outputs of stages $F_1$–$F_4$ of the $m$-sequence generator 50. The error locator 54 functions to provide an output signal when the condition of register 52 corresponds to the condition of the $m$-sequence generator 50. In this regard, the error locator unit may comprise any suitable signal comparing unit known in the art which provides an output signal in response to coincidence between a pair of four bit signals. For example, unit 54 may comprise four exclusive OR circuits which are connected to an inverter by a conventional OR circuit. Other arrangements are, of course, possible.

The error corrector unit 55 in this instance comprises a conventional AND gate 86 which has one input tap $a$ connected to the normally low output tap $c$ of the error trigger 64 and the other input tap $b$ connected to the output of the error locator 54. Stage C associated with the shift register 49 may also be considered a portion of the error correcting means in that the condition of stage C is complemented in response to the output signal from tap *c* of AND gate 86 at the time the bit which is in error is present in stage C.

The operation of the decoder when no error occurs in translation of the code group may be seen by reference to FIG. 5 which is a chart illustrating the decoding of the fifteen bit code group transmitted by the encoder 11. The chart of FIG. 5 is identical to the chart of FIG. 3, except that the first eleven bits are shifted into stages 1–11 of the register 49. Assuming error trigger 84 is set so that "no-error" tap *d* is high conditioning input AND gate 60, the fifteen bit code group is supplied to the AND gate 61 under control of the clock pulses C1–C15 from pulse generator 56. The eleven data bits are supplied to the shift register 49 through AND gate 61 under the control of clock pulses C1–C11, and are shifted in from left to right under the control of shift pulses S1–S11 applied to each of the stages of the shift register. M-sequence generator 50 provides the series of gating signals to condition gate unit 51 and allow reception parity checks to be made over the appropriate bit positions of the fifteen position code group. At the end of the reception parity check cycle each stage RP1–RP4 is 0, and the output signal from OR circuit 60 is therefore low. AND gate 82 of the error detector is therefore conditioned by this signal being inverted while AND gate 83 is not conditioned. The first shift pulse S1 of the next cycle is therefore supplied to input tap *a* of error trigger 84, which has no effect on the condition of trigger 84. The cycle is then repeated for the next code group.

The operation of the decoder 12 in correcting an error which has occurred during translation from the encoder 11 may be seen by reference to FIG. 6, which assumes that the error has occurred in the eighth bit position of the code group, that is, data bit $D_8$ is changed from a 1 to a 0.

FIG. 6 is a chart similar to FIG. 5, and since the operation of the decoder is identical to that which was just described up to the time that $D_8$ of the code group is supplied to gate unit 51, the chart begins at the time S7 has been supplied to gate unit 51. H-sequence generator 50 provides the same group of gating signals to gate unit 51 as in FIG. 5. However, since an error is present in the translated code group as received, the state of the reception parity bit register at the end of the cycle is not all 0's. As shown in Chart 6, register 52 assumes a 1010 condition, and if the parity check table of FIG. 3A is consulted it will be seen that condition 1010 is the locator subword for an error in the eighth bit position of the code group.

With 1010 in register 52, the output of OR circuit 80 is high conditioning AND gate 83, so that the S1 pulse of the next cycle applied to terminal *b* causes a signal to be supplied to terminal *b* of error trigger 84, resulting in a change of states. The normally high no-error tap *d* of trigger 84 therefore changes to a low state, while the normally low error tap *c* changes to a high state and conditions AND gate 86.

The input AND gate 60 is deconditioned by the drop of the no-error input tap *d*, and hence no data is supplied to either the shift register 49 or the gate unit 51 until the error is located and corrected. The reception parity bit register 52 therefore maintains its 1010 condition until the error is located. However, shift pulses S1–S15 supplied to the *m*-sequence generator 50 cause it to cycle while shift pulses S1–S11 supplied to the shift register 49 cause the group of data bits D1–D11 stored in the shift register to be shifted out through stage C of the error correcting unit 55. It will be seen from the lower portion of FIG. 6 that the condition of the *m*-sequence generator 50 and the reception parity bit register 52 coincide at shift pulse time S8. It should also be noted that at shift pulse time S8, the eighth position of the code group which contains the bit in error has been shifted into stage C of corrector unit 55.

Since AND gate 86 has been conditioned by the error signal from error trigger 84 at S1 time, the F—RP compare signal from the error locator 54 at shift time S8 is supplied to stage C through AND gate 86 as a correct-command signal. The correct-command signal causes the condition of stage C to reverse which, in effect, complements or corrects the value of the data bit presently in stage C. As shown in FIG. 6, the error in bit position 8 consisting of a 0 is corrected by changing it to a 1. The corrected data bit $D_8$ and subsequent bits $D_9$–$D_{11}$ are shifted out of the register through stage C to a suitable utilization device.

The reception parity bit register 52 in this instance is reset to the all 0 condition by the F—RP signal from the error locator 54 so that when the next S1 pulse is supplied to the error detector 53, a signal is supplied to terminal *a* of the error trigger 84 through AND gate 82, which is conditioned by the inverted normally low output signal of OR gate 80. The signal supplied to terminal *a* of error trigger 84 causes the trigger to change states and restore the decoder to its original starting condition. The decoder will operate in the above described manner to correct automatically an error occurring in any of the data bit positions $D_1$–$D_{11}$.

It will thus be seen that the present invention provides an error correcting system in which the advantages of a systematic assignment process of the parity bits to be checked are obtained simultaneously with the advantages of transmitting the data bits and the parity bits in their normal sequence.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for correcting a single error in a binary code group consisting of a predetermined number of information bits and a predetermined number of parity bits, comprising: an encoder including a shift register, means responsive to the counts of said shift register and said information for identifying unique sets of bits in the code group and means responsive to said identifying means to generate the parity bits; signal translating means; and, a decoder coupled to said encoder through said signal translating means, said decoder including a shift register, means responsive to the counts of said shift register for identifying the sets in the received code group corresponding to those identified by said encoder identifying means, and means responsive to said identifying means and the bit values in the sets to generate a correction signal.

2. The combination recited in claim 1 in which the code group occurs serially by bit and said encoder identifying means assigns only code group bits to be checked by a parity bit which are prior to the parity bit in the code group.

3. A system for correcting single errors in a binary code group having K parity bit positions and $2^K$—1 or less total bit positions comprising in combination an encoder, signal translating means and a decoder connected to said encoder through said signal translating means and operable to correct a single error in any bit position in said code group caused during translation of said code group, said encoder comprising means for generating K parity bits including a register having K stages for storing said parity bits, a gate unit having K coincidence circuits, means connecting the output of each said coincidence circuit to the input of a different one of said register stages, a shift register having K stages, a feedback path connected to a first stage of said shift register from preselected other stages to cause the signal supplied by each of said stages to correspond to an *m*-sequence, means connecting the output of each stage of said shift register to respective ones of said coincident circuits, means for advancing said shift register to cause K gating signals to be supplied to said gate unit, means for supplying data bits to said gate unit and said translating means after each advance of said shift register until $(2^K-1)-K$ or less advances, and means for supplying one of said generated parity bits to said gate unit and said translating means after each of the last K advances of said shift register, said decoder comprising means for generating K reception parity bits over bit positions of said code group determined by said shift register of said encoder, and means responsive to the condition of said generated reception parity bits for detecting, locating and correcting a single error in any bit position of said code group.

4. The combination of claim 1 and means responsive to the correction signal of said decoder generator means to change the value of a bit of the received code group indicated by the correction signal value to have been incorrectly translated.

5. The combination of claim 1 wherein said shift registers operate cyclically through a maximum number of counts equal to the number of bits in the code group.

6. The combination of claim 5 wherein said shift registers include feedback connections between selected stages.

7. The combination of claim 6 wherein the feedback connections of said shift registers comprise exclusive OR circuits.

8. The combination of claim 1 wherein said encoder bit set identification means comprises a group of AND gates, each one responsive to one output of a different stage of said encoder shift register and each one responsive to all of the information bits.

9. The combination of claim 8 wherein said encoder parity bit generator means comprises a set of stages, each one responsive to the output of a different one of said AND gates.

10. The combination of claim 1 wherein said encoder includes timing means to make said signal translating means sequentially responsive to the output of said parity bit generator means after response to the information bits.

11. The combination of claim 10 wherein said timing means comprises a pulse generator and a gating circuit connected between said pulse generator and said parity bit generator means.

References Cited in the file of this patent

UNITED STATES PATENTS

| | | |
|---|---|---|
| 2,894,684 | Nettleton | July 14, 1959 |
| 2,956,124 | Hagelbarger | Oct. 11, 1960 |

OTHER REFERENCES

Publication: J. H. Green, Jr., and R. L. San Soucie, "An Error-Correcting Encoder and Decoder of High Efficiency," Proceedings of the I.R.E., October 1958.